Jan. 21, 1969   A. G. BAROWS   3,422,611
CUTTER ASSEMBLY AND BLADE CONSTRUCTION THEREFOR
Filed July 1, 1965
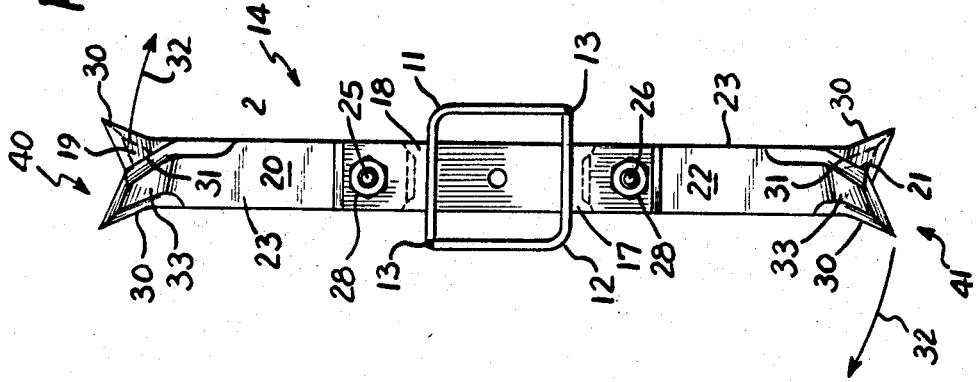
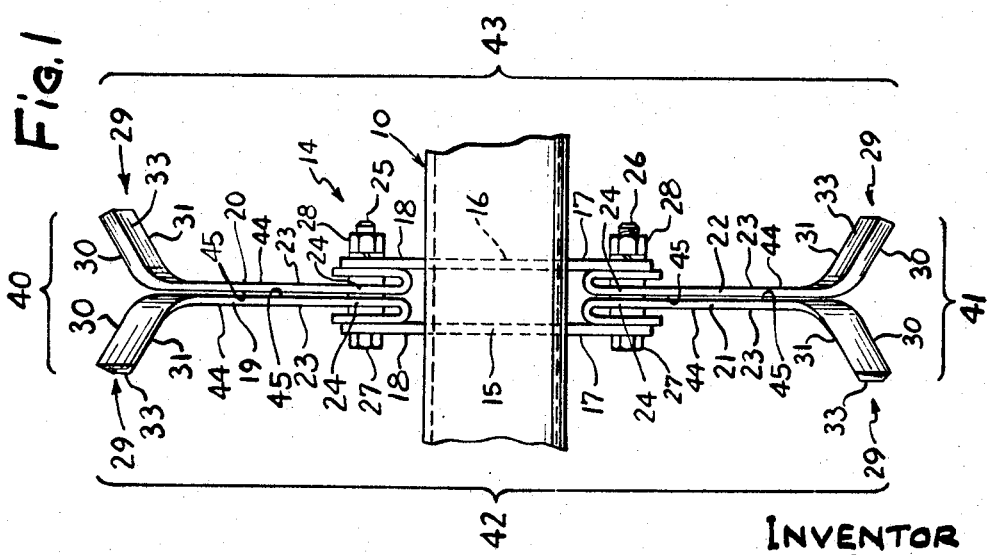
INVENTOR
ARTHUR G. BAROWS
ATTY.

United States Patent Office 3,422,611
Patented Jan. 21, 1969

3,422,611
CUTTER ASSEMBLY AND BLADE CONSTRUCTION THEREFOR
Arthur G. Barows, Downers Grove, Ill., assignor to International Harvester Company, a corporation of Delaware
Filed July 1, 1965, Ser. No. 468,690
U.S. Cl. 56—294       6 Claims
Int. Cl. A01d 55/18

ABSTRACT OF THE DISCLOSURE

A cutter having a pair of identical blades reversely positioned back-to-back and each blade having an acutely angled cutting portion presenting upper and lower cutting edges, and the pairs of blades being arranged in circumferentially overlapping relation and so disposed that the high cutting blades are overlapped with low cutting blades.

---

This invention relates to cutters adapted for use in harvesting of grass-like crops and the like. Specifically the invention relates to rotary cutter assemblies and the blade construction comprising such rotary cutter assemblies.

Rotary cutters of the class contemplated by the instant invention comprise a plurality of cutter assemblies which are employed for harvesting of grass-like crop, such as alfalfa, hay and the like, and may be used for forage harvesting. The blades of the cutter assemblies are conventionally disposed radially with respect to a rotor such as a shaft which provides an axis of rotation relative to which the blades are arranged in diametrically opposed pairs which may be mounted pendulously. Thereby the cutter blades are held in cutting position by the centrifugal force generated during cutting as the rotor is driven.

Conventional cutters of the subject class are constructed in the manner such that each usual rotary cutting element or cutter blade has a single cutting edge. Such construction compels that either the harvester device upon which a dull conventional blade is mounted be held inoperative while such blade is sharpened or a replacement blade be inventoried for use while a dull blade is being sharpened. To the extent that a conventional interval between required sharpenings can be increased by using a non-conventional blade, a conventional cutting blade is inefficient.

Additionally, conventional cutter blades of the defined class are adapted to cut crops at but a single level. Comminution or fine cutting of crops employing usual means results from mechanically throwing severed crop segments in the path of blades following those which cut the segments desired to be reduced in size. As a consequence, the average fineness of an end product will be inversely proportional to the ground speed of the cutter. That is to say, the faster that a conventional cutter is moved through a field, the coarser the average size of the crop particles cut by such cutter. Accordingly, to the extent that reduction in ground speed to obtain finely cut crop is minimized, cutting efficiency of cutters of the indicated class is maximized.

It is an object of the present invention to provide an improved centrifugal or flail cutter for harvesting grass-like crops and the like.

It is an additional object of the invention to provide in a centrifugal or flail cutter an improved cutter blade construction.

It is a further object of the instant invention to provide a centrifugal or flail cutter having high and low cutting edges, whereby crop may be finely chopped.

A yet further object of the instant invention is the provision of a centrifugal or flail cutter characterized by a reversible blade having a pair of cutting edges each of which can be selectively disposed for cutting of crop, whereby cutter blade life is doubled when compared to a conventional blade.

Another object of the instant invention is the provision of a centrifugal or flail cutter for harvesters, comprising a pair of diametrically opposed reversibly mounted cutter blades having pairs of cutting edges, respectively, with one cutting edge of each blade serving to cut crop at a different level from the other thereof while the other cutting edge of each blade is inactive for such purpose.

A yet further object of the present invention is the provision of a centrifugal or flail cutter for harvesters having a plurality of cutting blades arranged in longitudinally disposed and radially extending pairs, each of said pairs having high and low cutting edges, whereby fineness of comminution of crop is proportionate to the rate of cutter rotation and may be independent of ground speed of the vehicle upon which the cutter is mounted, thereby enabling time economies in fine cutting of crop to be effected which are not conventionally available.

The foregoing and other objects, features and advantages of the present invention will become more apparent upon consideration of the following description and appended claims, when considered in conjunction with the accompanying drawings wherein the same reference character or numeral refers to like or corresponding parts throughout the several views.

On the drawings:

FIG. 1 is a front elevational view of a section of a centrifugal cutter assembly embodying the present invention.

FIG. 2 is a view of a section of said cutter assembly looking toward the right side of FIG. 1.

Referring now more particularly to the drawings, there is shown a driven elongated rotor 10 which may be constructed of substantially right angular sections 11 and 12 by means of welding as at 13 to provide a substantially square construction, as illustrated in FIG. 2. The rotor 10 may be mounted to extend transversely of a harvesting machine upon which the centrifugal or flail cutter embodying the instant invention is adapted to be employed. The cutter comprising the present invention may be characterized by a plurality of like centrifugal or flail cutter assemblies, generally designated as 14, supported by said rotor and for which said rotor provides a thereof longitudinally extending axis of rotation. Only one of said cutter assemblies 14 is seen in the drawings and will be herein described.

The cutter assembly 14 shown in the drawings comprises a pair of rigid mounts, straps or ties 15 and 16 which are rigidly secured to the rotor 10 in spaced apart disposition longitudinally of the longitudinal axis of said rotor. The mounts, straps or ties 15 and 16 are elongated and disposed in parallel relationship with each other, each of said mounts, straps or ties 15 and 16 having a pair of opposite end portions 17 and 18. The end portions 17 and 18 of each mount, strap or tie 15 and 16 are projected outwardly from said rotor 10 diametrically from each other. Thereby, the mounts, straps or ties 15 and 16 provide a pair of diametrically oppositely projecting bracket-like extensions, each of which is adapted for mounting one-half of the cutter assembly 14. As illustrated, the halves of the cutter assembly 14 are diametrically disposed.

The cutter assembly 14 comprises a plurality of cutting blades 19, 20, 21 and 22 which are arranged in diametrically opposed or radially oppositely extending pairs 40 and 41, blade pair 40 comprising blades 19 and 20, and blade pair 41 comprising blades 21 and 22. Furthermore, the blades are arranged in pairs 42 and 43 which are disposed longitudinally of rotor 10 and extend transversely thereof, the blades 19 and 21 comprising pair 42 and the blades 20 and 22 comprising pair 43.

As illustrated in FIG. 1, each of the cutting blades 19, 20, 21 and 22 comprises an elongated shank 23 having an integral, centrally disposed J-shaped anchoring end portion 24. The shanks 23 have opposite parallel flat faces 44 and 45, respectively, which are disposed in planes extending transversely of the longitudinal axis of rotor 10.

The J-shaped end extensions 24 of the blades 19 and 20 are mounted adjacent each other between the mount, strap or tie end portions 18, while the J-shaped extensions 24 of the blades 21 and 22 are mounted adjacent each other between the mount, strap or tie end portions 17. The J-shaped extensions 24 are apertured, as are the outer end portions 17 and 18 of the mounts, straps or ties 15 and 16, thereby to accommodate a pair of hangers 25 and 26 for mounting of the blades 19 and 20 between the end portions 18 and the blades 21 and 22 between the end portions 17, as illustrated clearly in FIG. 1. In the embodiment of the invention illustrated, each of the hangers 25 and 26 comprises a bolt which has a head 27 mounted in engagement with the outer surface of the mount, strap or tie 15, said hangers 25 and 26 being releasably secured in position by means of a pair of nuts 28 which are mounted on the threaded ends of said hangers 25 and 26, respectively. By reason of the foregoing construction, the blades 19, 20, 21 and 22 are releasably mounted.

The outer end portion of each of the blades 19, 20, 21 and 22 comprises a cutting head generally designated by the numeral 29 and integral with a corresponding shank 23. Prior to formation, the cutting heads 29 are preferably disposed in the planes of and as wide as their respective shanks from the longitudinal axis of which such cutting heads are bent outwardly approximately 60° and twisted for formation. The twisting is such that the opposite sides or edges 30 and 31 of each head 29 are disposed at different levels relative to the axis of the rotor 10. Thereby, when the cutter assembly is in cutting position, or generally vertically disposed, as in the drawings, the edges 30 and 31 of each blade of a cutting pair thereof are disposed at different vertical levels and in different vertical planes.

As illustrated in the drawings, each cutting head 29 has what may be referred to as an outside face 33 which is co-extensive with a respective flat 44. Each face 33 is cut toward its opposite edges 30 and 31 by honing to sharpen such edges 30 and 31 and provide a pair of oppositely directed cutting edges on each cutting head. Cutting edges 30 are referred to as lower cutting edges, and cutting edges 31 are referred to as high cutting edges, for a reason which will become apparent presently.

Having reference to the drawings, it is seen that adjoining cutting blades, that is, each blade of the pairs 40 and 41, is substantially identical to the other blade of its pairs. That is to say, the blades 19 and 20 are substantially identical to each other, and the blades 21 and 22 are substantially identical to each other. The only difference relative to adjoining blades of the diametrically opposed pairs is that each is mounted at a disposition 180° from the other thereof. That is to say, blade 19 is rotated 180° on the longitudinal axis of the shank 23 from the blade 20. Similarly, blade 21 is rotated 180° on its shank 23 from the blade 22. Restated, considering the surfaces 45 of each shank 23 as its back and the cutting heads 29 as being projected forwardly, adjacent blades of pairs 40 and 41 may be considered in back to back relationship. In other words, the adjoining blades 19 and 20 of pair 40 may be considered as right-hand blades, and the adjoining blades 21 and 22 of the opposed pair 41 may be considered as left-hand blades.

As illustrated in the drawings, each blade of each of pairs 42 and 43 thereof is diametrically aligned with the other blade of such pair. That is to say, the blade 19 may be considered aligned diametrically with the blade 21, and the blade 20 may be considered to be diametrically aligned with the blade 22. Such arrangement results from aligning the shanks 23 of aligned blades diametrically with each other. Considering the drawings, it is seen that the blades of each of the diametrically opposed pairs 42 and 43 thereof are substantially mirror image duplications of each other. That is to say, the blades 19 and 21 are mirror image duplications of each other, and the blades 20 and 22 are mirror image duplications of each other.

The foregoing construction and arrangement of parts results in an unusual cutting effect, understanding of the nature of which will be facilitated by hypothecating that the blades are rotating clockwise with respect to FIG. 2 in the direction of arrows 32. Such rotation would result in the heads 29 of the blades 21 and 22 moving toward the viewer with respect to FIG. 1, and the heads 29 of the blades 19 and 20 moving away from the viewer with respect to FIG. 1. It is appreciated that the direction of rotation selected for description is arbitrary in that the blades could just as well be rotated in an opposite direction, that is, counterclockwise with respect to FIG. 2. However, when the blades are rotated as indicated by arrows 32, the low edge 30 of the blade 22 is a cutting edge, the inclination of its head 29 being such that surface 33 is a throwing flat. For the blade 22, the low edge 30 is the lead edge, and the high edge 31 is the trail edge which has no cutting effect. With respect to the adjoining blade 21, the high edge 31 is the lead and cutting edge, the low edge 30 being the trail edge and having no cutting effect. Accordingly, the blade 21 will cause cutting of the crop at a higher level than will the blade 22.

When the cutter assembly is disposed with the blades 19 and 20 in cutting position, that is, rotated 180° about rotor 10 from the position of FIG. 1, the high edge 31 of blade 20 will be the lead and cutting edge, and the low edge 30 of said blade 20 will be the trailing edge and have no cutting effect whatsoever. Then, with respect to the blade 19, the low edge 30 is the cutting edge, and the high edge 31 is the trail or non-cutting edge.

It is appreciated that the opposite cutting edges 30 and 31 of each blade are directed in opposite directions as a result of the slope or inclination of each head, whereby the downstream edge of each head 29 is a cutting edge while the opposite or upstream thereof is a trail edge and has no cutting effect. Furthermore, by reason of the foregoing construction and arrangement of parts, the diametrically opposed blades of each of the transversely disposed pairs 42 and 43 thereof have opposite high and low cutting edges which are effective for cutting or chopping during harvesting, while each blade has a trail edge which is not effective for cutting. That is to say, high edge 31 of the blade 21 and low edge 30 of the blade 19 are cutting edges or operative, while the low edge 30 of the blade 22 and the high edge 31 of the blade 20 are cutting edges or operative.

It is therefore appreciated that as the speed of rotation of the cutter is increased, fineness of the cut will increase to the point that each plant in the path of the cutter may be cut twice, that is, at a high level and at a low level. Resulting from such ability are time economies not conventionally available, because the fineness of the cut using the present invention will vary directly with rotor speed and may be independent of ground speed at which the cutter is moved.

In addition to the foregoing, the nature of the construction is such that when any cutting edge wears, it need merely be rotated 180° on an axis which is longitudinal of its shank, and interchanged with an adjoining blade the position of which will be similarly reversed, whereby those edges which were previously cutting edges become trail edges and those edges which were previously lead edges become cutting edges. That is to say, by rotating the blades 19 and 20 so that each occupies the position of, and is disposed as, the other thereof, the cutting edges of each thereof are reversed so that those which were previously trail edges now become lead or cutting edges.

Similarly, the blades 21 and 22 may be reversed. Thereby, double life is provided for each blade when considered in terms of prior art constructions which have only a single cutting edge.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. A rotary cutter assembly adapted for harvesting grass-like crops and comprising an elongated rotor having a longitudinal axis defining an axis of rotation and adapted to be mounted for rotation thereabout, a pair of blades, each blade of said pair having an outer end portion defining an angularly bent and twisted cutting head with leading and trailing sharpened edges, one blade of said pair being reversely connected to the rotor with respect to the other blade and providing a cutting edge at a level higher than the cutting edge of the adjacent blade of said pair, whereby each of said blades of the pair cut at a different level.

2. The invention according to claim 1 and another pair of said blades connected to the rotor diametrically from and oriented reversely to the first mentioned pair of blades.

3. The invention according to claim 1 and said blades having flat shank portions disposed back-to-back in a plane extending transversely of the rotor.

4. The invention according to claim 1 and each blade head having top and bottom sides, and the head cutting at a high level presenting its bottom side in a leading direction and the head cutting at a low level presenting its top side in a leading direction.

5. The invention according to claim 1 and said blades connected to said rotor for pivotal movement on axes disposed generally parallel with said axis of the rotor.

6. The invention according to claim 1 wherein said blades of the pair are substantially identical.

References Cited

UNITED STATES PATENTS

| | | | |
|---|---|---|---|
| 2,590,065 | 3/1952 | Mott | 56—29 XR |
| 2,877,619 | 3/1959 | Benson et al. | 56—295 |
| 2,974,888 | 3/1961 | Everett | 56—29 XR |
| 3,093,951 | 6/1963 | Barows et al. | 56—294 |

ANTONIO F. GUIDA, *Primary Examiner.*